United States Patent
Ishida et al.

(10) Patent No.: US 10,504,628 B2
(45) Date of Patent: Dec. 10, 2019

(54) PLATINUM OXIDE COLLOIDAL SOLUTION, MANUFACTURING METHOD THEREFOR, MANUFACTURE APPARATUS THEREOF, AND METHOD OF INJECTION NOBLE METAL OF BOILING WATER NUCLEAR POWER PLANT

(71) Applicant: Hitachi-GE Nuclear Energy Ltd., Hitachi-shi, Ibaraki (JP)

(72) Inventors: Kazushige Ishida, Tokyo (JP); Masahiko Tachibana, Tokyo (JP); Yoichi Wada, Tokyo (JP); Nobuyuki Ota, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 148 days.

(21) Appl. No.: 15/583,464

(22) Filed: May 1, 2017

(65) Prior Publication Data

US 2017/0236604 A1 Aug. 17, 2017

Related U.S. Application Data

(62) Division of application No. 14/084,157, filed on Nov. 19, 2013, now abandoned.

(30) Foreign Application Priority Data

Nov. 19, 2012 (JP) .................................. 2012-253078
Feb. 26, 2013 (JP) .................................. 2013-035424

(51) Int. Cl.
*B01J 13/00* (2006.01)
*G21C 15/28* (2006.01)
(Continued)

(52) U.S. Cl.
CPC ........... *G21C 15/28* (2013.01); *B01D 15/362* (2013.01); *B01J 13/0047* (2013.01); (Continued)

(58) Field of Classification Search
CPC ... B01D 15/362; B01J 13/0047; B01J 19/082; B01J 23/42; B01J 39/04; B01J 39/18; C02F 1/42
See application file for complete search history.

(56) References Cited

U.S. PATENT DOCUMENTS

| 4,842,811 | A | 6/1989 | Desilva |
| 5,448,605 | A | 9/1995 | Hettiarachchi |

(Continued)

FOREIGN PATENT DOCUMENTS

| JP | 7-97221 A | 4/1995 |
| JP | 7-311296 A | 11/1995 |

(Continued)

OTHER PUBLICATIONS

Hiroshi "Radiolysis of hexahydroxo-platinum complex aqueous solution". Nov. 5, 2001.*

(Continued)

*Primary Examiner* — Michael A Salvitti
(74) *Attorney, Agent, or Firm* — Crowell & Moring LLP

(57) ABSTRACT

An aqueous solution of alkali hexahydroxo platinate is produced. As a alkali hexahydroxo platinate, sodium hexahydroxoplatinate or potassium hexahydroxoplatinate is used. The aqueous solution of alkali hexahydroxo platinate is passed through a hydrogen form cation exchange resin layer in a cation exchange resin tower. The aqueous solution of alkali hexahydroxo platinate makes contact with the hydrogen form cation exchange resin of the hydrogen form cation exchange resin layer, thus a suspension of hexahydroxo platinic is generated. If gamma rays are irradiated to (Continued)

the suspension, a platinum oxide colloidal solution in which colloidal particles including a platinum dioxide, a platinum monoxide, and a platinum hydroxide exist is generated. In a platinum oxide colloidal solution, the content of impurities is little and a noble metal compound is dispersed stably in water.

11 Claims, 8 Drawing Sheets

(51) Int. Cl.

| | | |
|---|---|---|
| *B01J 23/42* | (2006.01) | |
| *B01J 37/34* | (2006.01) | |
| *C02F 1/42* | (2006.01) | |
| *G21C 17/022* | (2006.01) | |
| *B01D 15/36* | (2006.01) | |
| *B01J 19/08* | (2006.01) | |
| *B01J 39/04* | (2017.01) | |
| *B01J 39/18* | (2017.01) | |

(52) U.S. Cl.
CPC .......... *B01J 19/082* (2013.01); *B01J 23/42* (2013.01); *B01J 37/344* (2013.01); *B01J 39/04* (2013.01); *B01J 39/18* (2013.01); *C02F 1/42* (2013.01); *G21C 17/0225* (2013.01); *B01J 2219/0877* (2013.01); *B01J 2219/12* (2013.01)

(56) References Cited

U.S. PATENT DOCUMENTS

| | | | |
|---|---|---|---|
| 5,650,051 A | 7/1997 | Wada et al. | |
| 5,818,893 A | 10/1998 | Herttiarachchi | |
| 6,462,095 B1* | 10/2002 | Bonsel | B01J 35/0013 |
| | | | 106/1.21 |
| 6,724,854 B1 | 4/2004 | Kim et al. | |
| 2002/0034675 A1* | 3/2002 | Starz | B01J 13/0043 |
| | | | 429/465 |
| 2002/0101953 A1* | 8/2002 | Hettiarachchi | G21C 17/0225 |
| | | | 376/306 |
| 2006/0243602 A1* | 11/2006 | Andresen | B01J 23/06 |
| | | | 205/724 |
| 2008/0039536 A1 | 2/2008 | Fisher et al. | |
| 2008/0212733 A1 | 9/2008 | Pop et al. | |
| 2009/0086878 A1* | 4/2009 | Stellwag | G21C 17/0225 |
| | | | 376/207 |
| 2010/0180413 A1 | 7/2010 | Jeong | |
| 2010/0246745 A1 | 9/2010 | Hettiarachchi et al. | |
| 2013/0182814 A1 | 7/2013 | Okamura et al. | |
| 2014/0140465 A1* | 5/2014 | Ishida | G21C 17/0225 |
| | | | 376/306 |
| 2017/0236604 A1* | 8/2017 | Ishida | G21C 17/0225 |
| | | | 376/306 |
| 2017/0287573 A1* | 10/2017 | Ishida | C02F 1/68 |

FOREIGN PATENT DOCUMENTS

| | | |
|---|---|---|
| JP | 11-295480 A | 10/1999 |
| JP | 2002-245854 A | 8/2002 |
| JP | 2002-248350 A | 9/2002 |
| JP | 2003-215289 A | 7/2003 |
| JP | 2005-10160 A | 1/2005 |
| JP | 2006-312783 A | 11/2006 |
| JP | 2008-503332 A | 2/2008 |
| JP | 2013-6719 A | 1/2013 |
| JP | 2013-79158 A | 5/2013 |
| WO | WO99/17302 A1 | 4/1999 |

OTHER PUBLICATIONS

Ion Exchange. Hawley's Condensed Chemical Dictionary.Mar. 15, 2007. https://doi.org/10.1002/9780470114735.hawley09028.*
Suspension. Hawley's Condensed Chemical Dictionary. Mar. 15, 2007. https://doi.org/10.1002/9780470114735.hawley15395.*
Solution, True. Hawley's Condensed Chemical Dictionary. Mar. 15, 2007. https://doi.org/10.1002/9780470114735.hawley14956.*
Jayaweera et al., "Determination of the high temperature zeta potential and pH of zero charge of some transition metal oxides," Colloids and Surfaces A: Physicochemical and Engineering Aspects, 1994, pp. 19-27, vol. 85.
Japanese Office Action dated Jul. 7, 2015 (two pages).
Japanese-language Office Action issued in counterpart Japanese Application No. 2012-253078 dated Dec. 8, 2015 (Three (3) pages).
Hiroishi, D., et al., "Stability of Platinum Complex (2)", Atomic Energy Society of Japan Proceedings of 2000 (38th) Vernal Annual Meeting, vol. III, Overview and Nuclear Fuel Cycle and Materials, Mar. 28-30, 2000, Ehime University, with English translation (Ten (10) pages).
Japanese Office Action issued in counterpart Japanese Application No. 2013-035424 dated Feb. 16, 2016 with English-language translation (five (5) pages).
D. Hiroshi, "Radiolysis of hexahydoxo-platinum complex aqueous solution," UTNL-R-0413, Yayoi Symposium 2001, Elucidation and Application of the Effects of Radiation (5), Proceedings Nuclear Engineering Research Laboratory, Graduate School of Engineering, The University of Tokyo, Nov. 5, 2001, with English-language translation (twenty-two (22) pages).
D. Hiroshi et al., "Thermal and radiolytic stabilities of tetra-ammine platinum (II) complex in aqueous phase—Comparison with hexa-hydroxo platinum (IV) complex," Mar. 31, 2002, pp. 254-258, High Technology Research Center of Advanced Research Laboratory, Saitama Institute of Technology with partial English-language translation (seven (7) pages).
K. Ishigure, "Current Status of Water Chemistry in Japan," Chemistry 2002: International conference on water chemistry in nuclear reactors systems—operation optimisation and new developments, pp. 1-7, France, URL http://www.iaea.org/inis/collection/NCLCollectionStore/_Public/34/056/34056176.pdf.
A. B. Venediktov et al., "On Preparation of Platinum (IV) Nitrate Solutions from Hexahydroxoplatinates (IV)," Russian Journal of Applied Chemistry, 2012, pp. 995-1002, vol. 85, No. 7, Pleiades Publishing, Ltd.
Japanese Office Action issued in counterpart Japanese Application No. 2012-253078 dated Jul. 5, 2016 with English-language translation (five (5) pages).
Machine Translation of Publ. No. JP 2013079158 A, published May 2013, Japan Patent Office, Tokyo Japan, online at https://dossier1,-platpat.inpit.gp.jp/tri/all/odse/ODSE_GM101_Top.action (Download Aug. 18, 2016), pp. 1-17.
Machine Translation of Publ. No. JP 2013006719 A, published Jan. 2013, Japan Patent Office, Tokyo Japan, online at https://dossier1,-platpat.inpit.gp.jp/tri/all/odse/ODSE_GM101_Top.action (Download Aug. 18, 2016), pp. 1-15.
Pennycuick, "Colloidal Platinum and Its Behavior as a Typical Acidoid Sol", The Journal of the American Chemical Society, vol. 52, Dec. 1930 No. 12, pp. 4621-4635.
Altmann et al., "Novel Catalytic Gas Sensors Based on Functionalized Nanoparticle layers", Sensors and Actuators B 174 (2012) 145-152.

* cited by examiner

PLATINUM OXIDE COLLOIDAL SOLUTION, MANUFACTURING METHOD THEREFOR, MANUFACTURE APPARATUS THEREOF, AND METHOD OF INJECTION NOBLE METAL OF BOILING WATER NUCLEAR POWER PLANT

CROSS REFERENCE TO RELATED APPLICATIONS

This application is a divisional of U.S. application Ser. No. 14/084,157, filed Nov. 19, 2013, which claims priority from Japanese Patent Application Nos. 2013-035424, filed Feb. 26, 2013 and 2012-253078, filed Nov. 19, 2012, the disclosures of all of which are expressly incorporated by reference herein.

BACKGROUND OF THE INVENTION

Technical Field

The present invention relates to a platinum oxide colloidal solution, a manufacturing method therefor, a manufacture apparatus thereof, and a method of injecting a noble metal of a boiling water nuclear power plant.

Background Art

In a boiling water nuclear power plant, it is important from the viewpoint of improving operation rate of the boiling water nuclear power plant to suppress stress corrosion cracking of reactor internals installed in a reactor pressure vessel and pipes (for example, recirculation pipes) connected to the reactor pressure vessel.

Regarding the stress corrosion cracking, the following is known and measures for the stress corrosion cracking are taken. High-temperature and high-pressure cooling water (hereinafter, referred to as reactor water) in contact with the reactor internals, and the pipes connected to the reactor pressure vessel contains oxygen and hydrogen peroxide generated by radiolysis of the reactor water in a core in the reactor pressure vessel. Therefore, the stress corrosion cracking progresses remarkably as the oxygen concentration and hydrogen peroxide concentration in the reactor water increase. The progress of each stress corrosion cracking in the reactor internal and pipes in contact with the reactor water can be suppressed by reducing the oxygen concentration and hydrogen peroxide concentration in the reactor water.

There is noble metal injection as a typical method for suppressing the stress corrosion cracking. The noble metal injection is a technology of injecting a compound of a noble metal (platinum, rhodium, or palladium) into the reactor water, depositing the noble metal on surfaces of the reactor internals and an inner surface of each pipe connected to the reactor pressure vessel, and injecting hydrogen into the reactor water (for example, refer to Japanese Patent Laid-open No. 7(1995)-311296). The noble metal promotes the respective reactions of hydrogen with each of oxygen and hydrogen peroxide and reduces the oxygen concentration and hydrogen peroxide concentration in the reactor water in contact with the surfaces of the reactor internals and the inner surface of each pipe connected to the reactor pressure vessel. Japanese Patent Laid-open No. 7(1995)-311296 describes an acetylacetonate compound of a noble metal and a nitric compound of a noble metal as a noble metal compound to be injected into the reactor water. In Japanese Patent Laid-open No. 7(1995)-311296, a solution with the nitric compound of the noble metal dissolved in water or a solution with the acetylacetonate compound of the noble metal dissolved in alcohol such as ethanol is injected into the reactor water.

On the other hand, although not for the reactor water, in Japanese Patent Laid-open No. 2002-245854, a metal colloidal liquid containing a compound having respectively at least one of an amino group and a carboxyl group is disclosed. Here, gold, silver, copper, platinum, palladium, rhodium, ruthenium, iridium, osmium and others as a metallic component are cited. Further, it is described that light such as UV, an electron beam, and thermal energy may be used for reduction of metallic salt. Furthermore, as a method for washing a solution including metallic colloidal particles, a method of demineralizing by an ultra-filter or an ion exchanger is described.

It is described in Japanese Patent Laid-open No. 2003-215289 that nano particles including a noble metal are injected into the reactor water. In Japanese Patent Laid-open No. 2003-215289, ZnO, $Al_2O_3$, or $ZrO_2$ as a neutral active material is used and noble metal nano particles with a noble metal (platinum, palladium, ruthenium, rhodium, osmium, or iridium) adhered on the surface of the neutral active material are injected into the reactor water flowing through the recirculation system connected to the reactor pressure vessel. Hydrogen is injected into the reactor water and the hydrogen and the oxygen contained in the reactor water are reacted to water by the catalytic activity of the noble metal. As a result, the dissolved oxygen concentration in the reactor water is reduced.

Further, Japanese Patent Laid-open No. 2005-10160 describes a method of preventing stress corrosion cracking of structural material. In the method of preventing the stress corrosion cracking, an enriched suspension of catalyst nano particles of a noble metal (for example, platinum) is injected into the reactor water in the reactor pressure vessel through the pipe (for example, a residual heat removal pipe, a recirculation pipe, and a water feed pipe, etc.) connected to the reactor pressure vessel.

The pipes connected to the reactor pressure vessel are made up of stainless steel or carbon steel, so that if any pipe is exposed to high-temperature water, the inner surface (liquid contact surface) of the pipe is covered with an oxide film containing a main component of $\alpha\text{-}Fe_2O_3$. It is reported that a point of zero charge (pH when the surface potential becomes 0) of $\alpha\text{-}Fe_2O_3$ is 3.7 to 5.2 at 23° C. and 3.4 at 235° C. (P. Jayaweera et al., Colloids and Surfaces A: Physicochemical and Engineering Aspects, 85, pp. 19-27 (1994)).

CITATION LIST

Patent Literature

[Patent Literature 1] Japanese Patent Laid-open No. 7(1995)-311296
[Patent Literature 2] Japanese Patent Laid-open No. 2002-245854
[Patent Literature 3] Japanese Patent Laid-open No. 2003-215289
[Patent Literature 4] Japanese Patent Laid-open No. 2005-10160
[Non Patent Literature] P. Jayaweera et al., Colloids and Surfaces A: Physicochemical and Engineering Aspects, 85, pp. 19-27 (1994)

SUMMARY OF THE INVENTION

Technical Problem

A solution that nitric acid compound of the noble metal is dissolved in water or a solution that acetylacetonate compound of the noble metal is dissolved in alcohol such as ethanol which are described in Japanese Patent Laid-open No. 7(1995)-311296 brings not only the noble metal but also nitric acid, acetylacetone, or alcohol into the reactor water. The nitric acid compound discharges nitric acid ions into the reactor water, so that there is a possibility of increasing electric conductivity of the reactor water. The acetylacetonate compound and alcohol discharge organic acid ions and carbon ions into the reactor water, so that there is a possibility of increasing the electric conductivity of the reactor water. The increase in the electric conductivity of the reactor water is not preferable from the viewpoint of corrosion suppression of the structural member of the nuclear power plant.

It is desirable to reduce the electric conductivity of the reactor water from the viewpoint of corrosion suppression of the structural member of the nuclear power plant. Furthermore, impurities may be activated by neutron irradiation in the core and become an exposure source. Therefore, it is preferable to reduce the impurity content in the reactor from the viewpoint of exposure reduction.

On the other hand, to inject a noble metal compound into the reactor water, it is necessary that the noble metal compound is stably dispersed in the solution that the compound is injected. If the noble metal compound is not dispersed stably in the concerned solution and is in a depositable form, the noble metal compound is deposited in the pipe through which it is injected into the reactor water and the pipe is blocked, so that there is a fear that the noble metal compound may not be injected into the reactor water.

The colloidal particles included in the metallic colloidal liquid described in Japanese Patent Laid-open No. 2002-245854 contain a main component of a metal but do not contain a main component of a metallic oxide. Further, the deminaralization by the ion exchanger described in Japanese Patent Laid-open No. 2002-245854 is executed after generation of the metallic colloidal particles and it is considered difficult to sufficiently remove ions adsorbed to the colloidal particles.

Regarding the injection of the noble metal nano particles with the noble metal adhered on the surface of the neutral active material which is described in Japanese Patent Laid-open No. 2003-215289 and the injection of the noble metal catalyst nano particles which is described in Japanese Patent Laid-open No. 2005-10160, since nitric acid, acetylacetone, and alcohol are not injected into the reactor water, the increase in the electric conductivity of the reactor water can be avoided and the corrosion of the plant structural member can be suppressed. However, as a result of the examination on the noble metal injection methods described in Japanese Patent Laid-open No. 2003-215289 and Japanese Patent Laid-open No. 2005-10160, the inventors found that the problem explained below arises.

The point of zero charge (pH when the surface potential becomes 0) of ZnO, $Al_2O_3$, and $ZrO_2$ which are neutral active materials described in Japanese Patent Laid-open No. 2003-215289 is 9 to 11 and the neutral active material is positively charged in neutral pure water (pH 7) (in the case of alkaline from the point of zero charge, charged negatively and in the case of acidity, charged positively). On the other hand, an inner surface of an injection pipe of the noble metal nano particle injecting apparatus connected to the pipe connected to the reactor pressure vessel is covered with an iron oxide film and the point of zero charge of the iron oxide is 3.7 to 5.2, so that the inner surface of the injection pipe is charged negatively when this inner surface comes into contact with the neutral pure water (pH 7). Therefore, there is a risk that the neutral active material is adsorbed electrostatically to the oxide on the inner surface of the injection pipe. If the neutral active material with the noble metal adhered on its surface is deposited on the inner surface of the injection pipe, the quantity of the noble metal (for example, platinum) brought into the reactor pressure vessel is reduced and in correspondence to it, the neutral active material with the noble metal adhered on its surface must be injected excessively.

In Japanese Patent Laid-open No. 2005-10160, when injecting the enriched suspension of the catalyst nano particles of the noble metal into the reactor water in the reactor pressure vessel through the injection pipe of the noble metal nano particle injector connected to the pipe connected to the reactor pressure vessel, there is a risk that a part of the nano particles included in the enriched suspension precipitates in the injection pipe with no stirrer installed. Therefore, the noble metal quantity injected into the reactor water in the reactor pressure vessel is reduced, so that the catalyst nano particles of the noble metal must be injected excessively.

A first object of the present invention is to provide a platinum oxide colloidal solution which has little impurity content and in which the noble metal compound is stably dispersed in water.

A second object of the present invention is to provide a method of injecting a noble metal of the boiling water nuclear power plant capable of suppressing deposition of the noble metal on an inner surface of a injection pipe and increasing quantity of the noble metal injected into cooling water in a reactor pressure vessel.

Solution to Problem

A feature of the first invention for attaining the above first object is that a suspension is generated by substituting hydrogen ions for cations included in an aqueous solution of hexahydroxoplatinate salt, and a platinum oxide colloidal solution is manufactured by irradiating the obtained suspension with gamma rays.

A feature of the second invention for attaining the above second object is that a noble metal compound colloidal solution including colloidal particles including a noble metal oxide and a noble metal hydroxide, a surface of each of the colloidal particles being charged negatively at pH of 5.6 or higher, is injected into a pipe connected to a reactor pressure vessel through an injection pipe connected to the pipe connected to the reactor pressure vessel; and the noble metal compound colloidal solution is injected into cooling water in the reactor pressure vessel through the pipe connected to the reactor pressure vessel.

When the noble metal compound colloidal solution including the colloidal particles is injected into the cooling water in the reactor pressure vessel through the injection pipe connected to the pipe connected to the reactor pressure vessel and the pipe connected to the reactor pressure vessel, the colloidal particles included in the noble metal compound colloidal solution are not adsorbed to each inner surface of the injection pipe and the pipe connected to the reactor pressure vessel because the surface of each of the colloidal particles is charged negatively at pH of 5.6 or higher. Therefore, the quantity of the colloidal particles injected into the cooling water in the reactor pressure vessel can be increased and the quantity of the noble metal injected into the cooling water can be increased.

Advantageous Effect of the Invention

According to the first invention, a platinum oxide colloidal solution that the content of impurities (a compound including an element except platinum, oxygen, and hydrogen) is little and platinum oxide colloidal particles are stably dispersed in water can be obtained. When injecting the platinum oxide colloidal solution into the reactor water, the pipe used for injection can be prevented from clogging. And, when injecting the platinum oxide colloidal solution into the reactor water, the impurities can be prevented from mixing with the reactor water. As a result, the increase in the electric conductivity of the reactor water can be suppressed.

According to the second invention, deposition of the noble metal to each inner surface of the injection pipe and the pipes connected to the reactor pressure vessel to which the injection pipe is connected is suppressed and the quantity of the noble metal injected into the cooling water in the reactor pressure vessel can be increased.

DETAILED DESCRIPTION OF THE PREFERRED EMBODIMENTS

Figure 1:
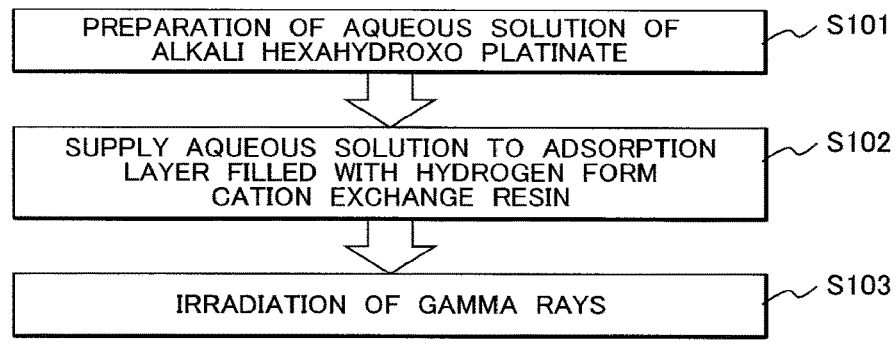
FIG. 1 is a flow chart showing a method of manufacturing platinum oxide colloidal solution according to embodiment 1 which is a preferable embodiment of the present invention.

The inventors examined manufacturing of platinum oxide colloidal solution (platinum oxide sol) of which impurity content is little and noble metal compound is dispersed stably in water.

As a result, the inventors found that gamma rays are irradiated to a suspension of hexahydroxo platinic generated by substituting alkaline ions ($Na^+$, $K^+$) in an aqueous solution of hexahydroxoplatinate salt (sodium hexahydroxoplatinate ($Na_2Pt(OH)_6$) or potassium hexahydroxoplatinate ($K_2Pt(OH)_6$)), that is, alkali hexahydroxo platinate for the hydrogen ions ($H^+$), thus the above platinum oxide colloidal solution can be generated.

To substitute the hydrogen ions for the alkaline ions (cations) in the aqueous solution of the alkali hexahydroxo platinate, it is desirable to permit the aqueous solution of the alkali hexahydroxo platinate to pass through an adsorption layer filled with hydrogen form cation exchange resin (cation exchange resin with hydrogen ions adsorbed to cation exchange group), thus substituting the alkaline ions for hydrogen ions included in hydrogen form cation exchange resin. If the hydrogen ions are substituted for the alkaline ions, the suspension of hexahydroxo platinic (the suspension of hexahydroxo platinic acid) is generated.

Then, if gamma rays are irradiated to the suspension of hexahydroxo platinic, a brown and transparent platinum oxide colloidal solution is generated. The generation of the platinum oxide colloidal solution depends on the absorption dose which is a product of the absorption dose rate of the irradiated gamma rays and the irradiation time. If the absorption dose is small, hexahydroxoplatinic particles remain. The hexahydroxoplatinic particles in the suspension of hexahydroxo platinic generated by substituting the alkaline ions for the hydrogen ions float in water for one to two days, though after a longer period of time than it, those particles are deposited. Therefore, it is desirable to irradiate gamma rays until platinum oxide colloid is generated. If gamma rays are irradiated 7 kGy or more as an absorption dose, the hexahydroxo platinic can be made to platinum oxide colloid.

The methanol concentration included in the aqueous solution of the alkali hexahydroxo platinate or the suspension of the hexahydroxo platinic must be set to 0.03 mM (M is mol/L) or lower. The reason is that if the methanol concentration becomes higher than this, the hexahydroxo platinic is reduced to a platinum metal and is deposited. In the case of ethanol and propanol, they must be respectively set to 0.015 mM and 0.01 mM or lower.

Hereinafter, the preferable embodiments of the present invention will be explained in detail by referring to the drawings.

Embodiment 1

A method of manufacturing platinum oxide colloidal solution according to embodiment 1 which is a preferable embodiment of the present invention will be explained by referring to FIGS. 1, 2, and 3.

FIG. 1 shows manufacturing processes of the platinum oxide colloidal solution.

The manufacturing processes of the platinum oxide colloidal solution include three processes.

An aqueous solution of a alkali hexahydroxo platinate (hexahydroxoplatinate salt) at a predetermined concentration is produced (step S101).

The metallic ions (cations such as sodium ions and potassium ions are removed from the aqueous solution (step S102) (an ion exchange process). Gamma rays are irradiated to the suspension generated due to removal of the metallic ions (step S103) (a colloidal generation process).

In step S101, the aqueous solution of the alkali hexahydroxo platinate is produced. When the alkali hexahydroxo platinate is obtained as a solid, the solid is dissolved in pure water and the aqueous solution of the alkali hexahydroxo platinate at a predetermined concentration is produced. When the alkali hexahydroxo platinate is obtained as a aqueous solution, it is diluted by pure water to the predetermined concentration.

In step S102, hydrogen ions are substituted for the metallic ions included in the aqueous solution of the alkali hexahydroxo platinate. The preferable method is a method using the hydrogen form cation exchange resin. When the aqueous solution of the alkali hexahydroxo platinate is supplied to an adsorption layer filled with the hydrogen form cation exchange resin and is come into contact with the hydrogen form cation exchange resin, the cations ($Na^+$ or $K^+$) included in the solution are adsorbed to the hydrogen form cation exchange resin and the hydrogen ions are discharged into the aqueous solution. By doing this, the cations such as sodium ions and potassium ions are removed from the aqueous solution of the alkali hexahydroxo platinate.

Figure 2:
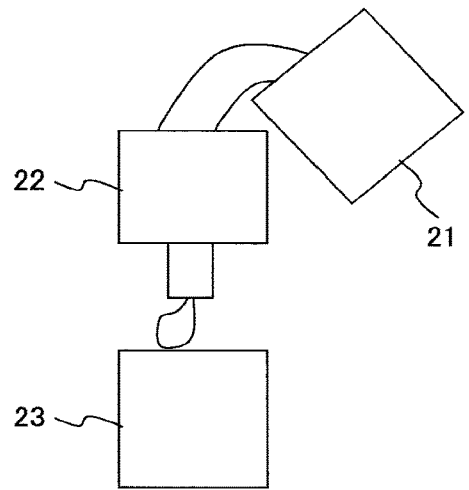
FIG. 2 is a schematic diagram showing an apparatus of substituting metallic ions included in solution of hexahydroxoplatinate salt for hydrogen ions, the apparatus being used for a method of manufacturing platinum oxide colloidal solution of embodiment 1.

FIG. 2 is a schematic diagram showing an apparatus for substituting the metallic ions in the aqueous solution of the alkali hexahydroxo platinate for the hydrogen ions.

As shown in FIG. 2, the aqueous solution of the alkali hexahydroxo platinate stored in a vessel 21 is supplied to a hydrogen form cation exchange resin tower 22 having the adsorption layer filled with the hydrogen form cation exchange resin. The aqueous solution flowing out from the adsorption layer filled with the hydrogen form cation exchange resin in the hydrogen form cation exchange resin tower 22 is collected by a vessel 23. When the aqueous solution of the alkali hexahydroxo platinate comes into contact with the hydrogen form cation exchange resin in the hydrogen form cation exchange resin tower 22, the hydrogen ions included in the hydrogen form cation exchange resin in the adsorption layer are substituted for the metallic ions included in the aqueous solution of the alkali hexahydroxo platinate and the aqueous solution becomes cloudy. The reason is that immediately after the substitution of the metallic ions for the hydrogen ions, the hardly soluble hexahydroxo platinic included in the solution is precipitated in the solution. Here, the solution got cloudy by the hexahydroxo platinic is called a suspension of hexahydroxo platinic. If the suspension of hexahydroxo platinic is produced by such a method, the hexahydroxo platinic particles float in water for about one to two days. However, the hexahydroxo platinic particles are deposited after a longer period of time than this.

In step S103, gamma rays are irradiated to the suspension of hexahydroxo platinic. The irradiation of gamma rays to the suspension of hexahydroxo platinic is executed while the hexahydroxo platinic particles float in water.

Figure 3:
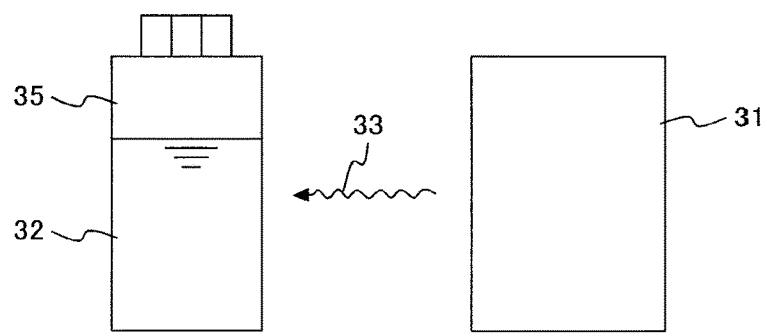
FIG. 3 is a structural diagram showing the apparatus of irradiating gamma rays to suspension of hexahydroxo platinic.

FIG. 3 shows a structure of an apparatus for irradiating gamma rays.

A vessel 35 filled with the suspension 32 of the hexahydroxo platinic is installed in the vicinity of a gamma rays generation source 31 (gamma rays generation apparatus) as shown in FIG. 3. The irradiation rate of gamma rays 33 from the gamma rays generation source 31 to the suspension 32 of the hexahydroxo platinic in the vessel 35 is decided so as to set the absorption dose to 7 kGy or higher. The operations of injection of gas and stirring of the liquid are not necessary.

The appropriate irradiation rate of the gamma rays 33 is set based on experimentation.

Figure 4:
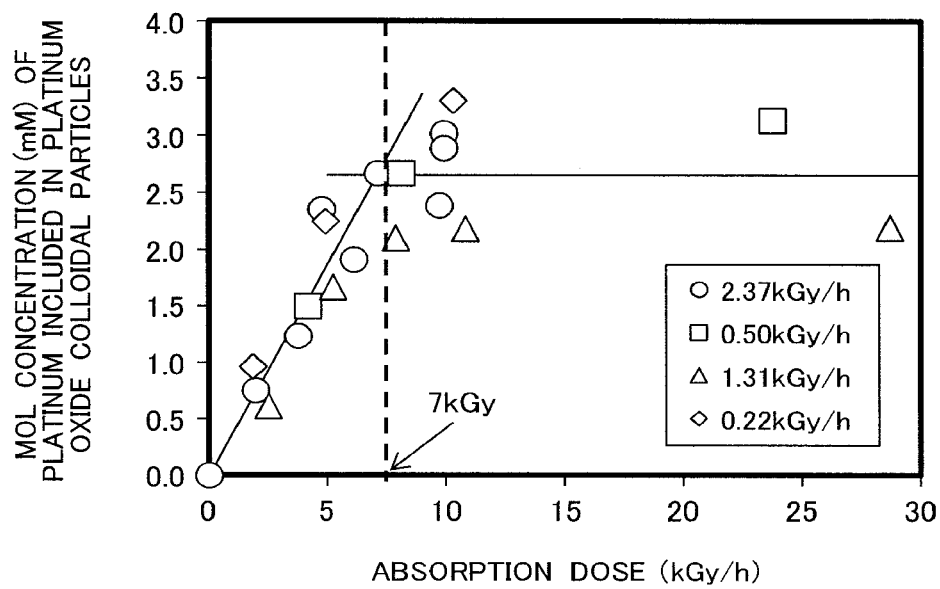
FIG. 4 is a characteristic diagram showing a relation between absorption dose of gamma rays and concentration of generated platinum oxide colloidal solution.

FIG. 4 shows a relation between absorption dose of gamma rays and concentration of generated platinum oxide colloid. Here, as an example of the alkali hexahydroxo platinate, sodium hexahydroxoplatinate is used. The platinum concentration used for the experimentation is about 2.6 mM. A horizontal axis indicates an absorption dose of gamma rays and a vertical axis indicates a mol concentration (based on the colloidal solution volume) of the platinum included in the platinum oxide colloidal particles.

FIG. 4 shows that when the platinum oxide colloidal concentration increases in correspondence to the increase in the absorption dose and the absorption dose reaches 7 kGy or higher, all the amount of platinum in the liquid becomes platinum oxide colloid within the range of measurement variations. It is confirmed that when the absorption dose rate is within the range from 0.22 to 2.37 kG/h, the same results are obtained.

According to the aforementioned manufacturing processes, the colloidal solution is generated after the cations such as sodium ions and potassium ions are removed from the aqueous solution of the hexahydroxoplatinate, so that the concerned cations can be prevented from adsorbing to the colloidal particles.

When dissolving the alkali hexahydroxo platinate in water, there is a case that it is dispersed in alcohol such as methanol and then is added into water. Even when the alkali hexahydroxo platinate is hardly soluble in water, it is known that if it is dispersed in alcohol, it may be dissolved in water. By such an operation, there is a possibility that alcohol may be included in the aqueous solution of the alkali hexahydroxo platinate.

To examine the influence of alcohol, a relation between methanol addition concentration and the absorption dose when methanol is added as alcohol and existence of generation of a platinum oxide colloidal solution are examined.

Figure 5:
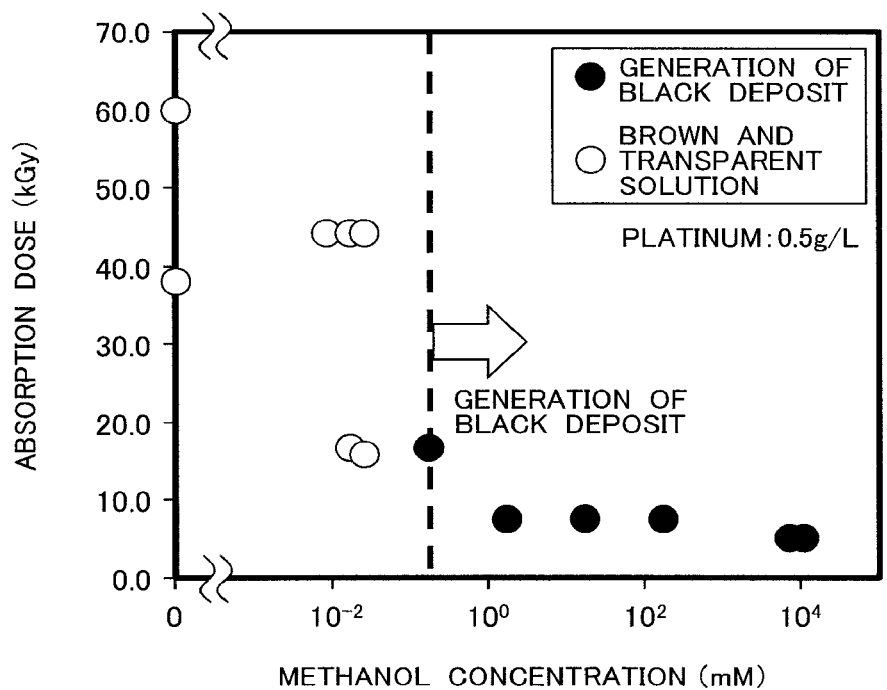
FIG. 5 is an explanatory drawing showing results of investigation of influence of methanol on reduction of hexahydroxo platinic.

FIG. 5 shows the results. A horizontal axis indicates a methanol concentration and a vertical axis indicates the absorption dose. Further, in FIG. 5, a mark of ○ (white circle) indicates generation of a brown and transparent solution and a mark of ● (black circle) indicates generation of a black deposit.

When the methanol addition concentration is 0.03 mM or lower, a brown and transparent solution is generated and no black deposit is generated. On the other hand, when the methanol addition concentration is 0.17 mM or higher, a black deposit is generated. Therefore, the methanol concentration must be suppressed preferably to lower than 0.17 mM and more preferably to 0.03 mM or lower.

When another alcohol ($C_nH_{2n+1}OH$, n=1, 2, - - - ) is contained, generally, the methanol concentration may be suppressed preferably to lower than 0.17/n (mM) and more preferably to 0.03/n (mM) or lower. For example, n=2 indicates ethanol, though in the case of methanol, the methanol concentration may be suppressed preferably to 0.085 mM or lower and more preferably to 0.015 mM or lower. Further, n=3 indicates propanol, though in the case of propanol, the propanol concentration may be suppressed preferably to 0.056 mM or lower and more preferably to 0.01 mM or lower.

As aforementioned, the apparatuses shown in FIGS. 2 and 3 are of a batch type.

The characteristics of the platinum oxide colloidal solution manufactured by the manufacturing method of the platinum oxide colloidal solution of the present embodiment will be explained hereunder.

The platinum oxide colloidal solution is an aqueous solution containing platinum oxide colloidal particles.

The colloidal particles include platinum oxide and platinum hydroxide having a platinum valence of 2 to 4.

The colloidal particles desirably include platinum dioxide of 90 atomic % of higher.

An aqueous solution including colloidal particles of platinum oxide may include alcohol. As for alcohol, when the number of carbons configuring the molecule thereof is n, the alcohol concentration is desirably lower than 0.17/n (mM).

Figure 6:
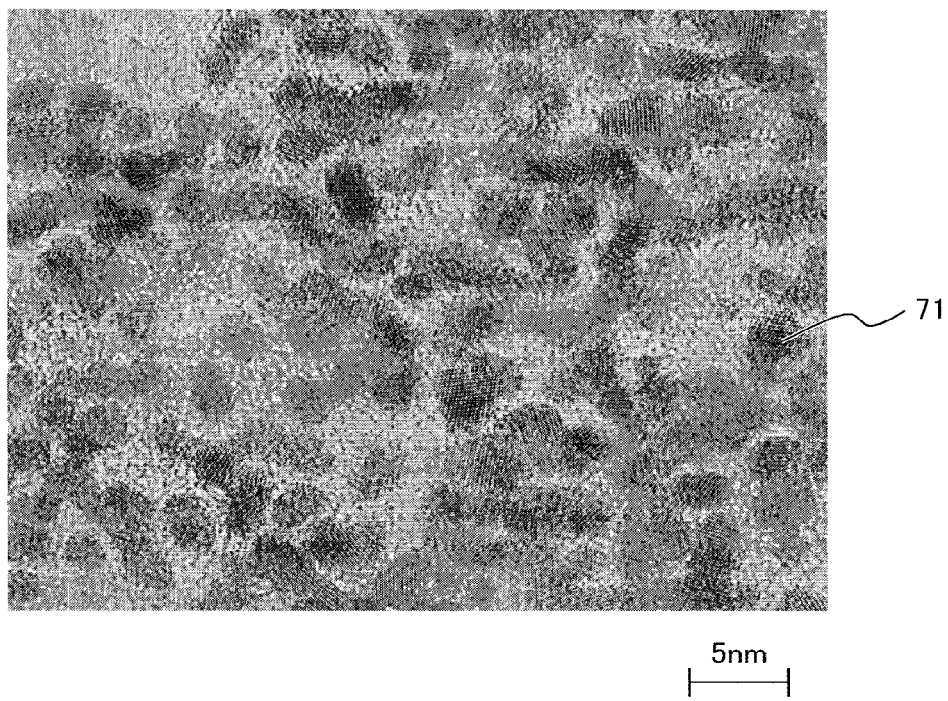
FIG. 6 is a transmission electron microscopic photograph showing platinum oxide colloidal particles included in platinum oxide colloidal solution manufactured in embodiment 1.

FIG. 6 is a transmission electron microscopic photograph showing the platinum oxide colloidal particles included in the platinum oxide colloidal solution manufactured in the present embodiment.

In FIG. 6, the mean particle diameter of a colloidal particle 71 is 2.30±0.52 nm. Here, the mean particle diameter is a value obtained by measuring the diameters of the particles displayed on the transmission electron microscopic photograph in a fixed direction and calculating a mean value.

Figure 7:
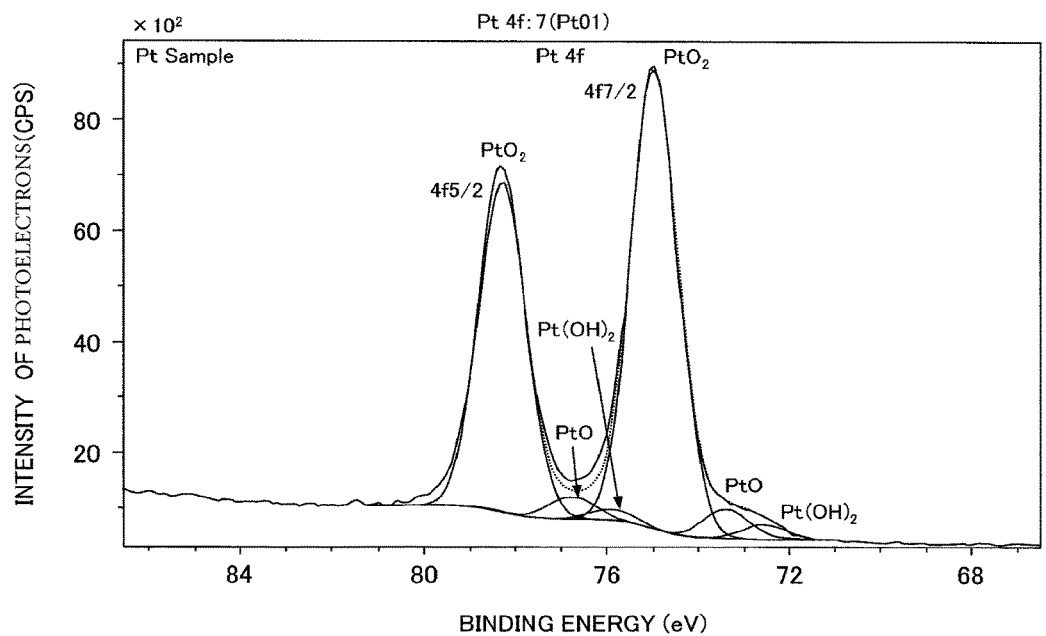
FIG. 7 is a graph showing X-ray photoelectron spectroscopy (XPS) analytical results of platinum oxide colloidal particles included in platinum oxide colloidal solution manufactured in embodiment 1.

FIG. 7 is a graph showing the X-ray photoelectron spectroscopy analytical results of the platinum oxide colloidal particles of the embodiment included in the platinum oxide colloidal solution manufactured in the present embodiment. The horizontal axis indicates binding energy and a vertical axis indicates intensity of phtoelectrons.

FIG. 7 shows that the colloidal particles have a main component of $PtO_2$ and contain PtO and $Pt(OH)_2$. Further, impurities other than Pt, O, and H are not detected and it is found that the colloidal particles are substantially made up of only these 3 elements.

The colloidal particles do not substantially include an alkali metal and an alkaline earth metal.

Table 1 shows the calculated results of the rates of these components.

TABLE 1

| | Compound | | |
|---|---|---|---|
| | $Pt(OH)_2$ | PtO | $PtO_2$ |
| at % | 3 | 6 | 91 |

$PtO_2$ is 91 atomic %, and 6 atomic % of PtO and 3 atomic % of $Pt(OH)_2$ are included.

Further, it is found that the platinum oxide colloidal particles are charged negatively by the electrophoresis measurement.

According to the present embodiment, the platinum oxide colloidal solution that the content of impurities (compounds including elements except platinum, oxygen, and hydrogen) is little and the platinum oxide colloidal particles are dispersed stably in water can be obtained. When injecting the platinum oxide colloidal solution into the reactor water, the pipe used for injection can be prevented from clogging. And, when injecting the platinum oxide colloidal solution into the reactor water, the impurities can be prevented from mixing with the reactor water. As a result, the increase in the electricity conductivity of the reactor water can be suppressed.

Embodiment 2

The manufacturing method of the platinum oxide colloidal solution according to 2 which is another preferable embodiment of the present invention will be explained by referring to FIG. 8. In the manufacturing method of the present embodiment, the platinum oxide colloidal solution can be manufactured continuously.

Figure 8:
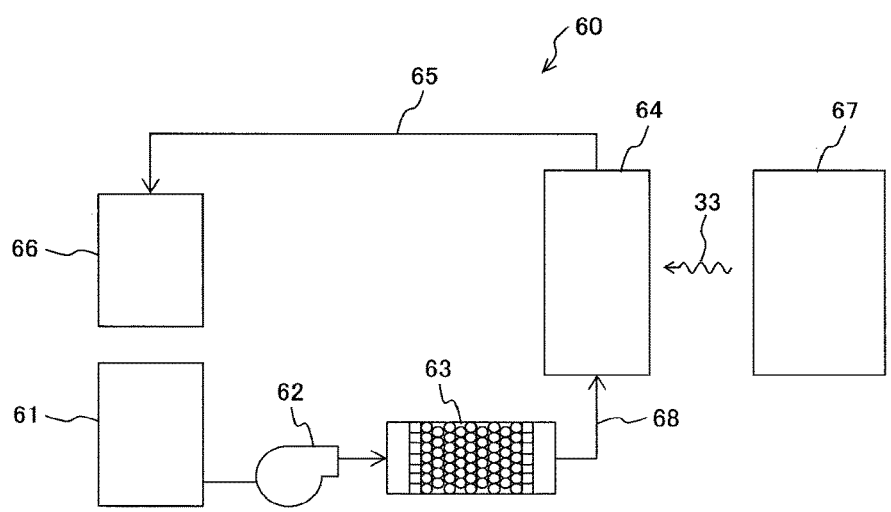
FIG. 8 is a structural diagram showing a manufacturing apparatus of platinum oxide colloidal solution used for a method of manufacturing platinum oxide colloidal solution according to embodiment 2 which is another preferable embodiment of the present invention.

FIG. 8 shows a structure of a manufacturing apparatus of the platinum oxide colloidal solution used for the manufacturing method of the platinum oxide colloidal solution of the present embodiment and the manufacturing apparatus can manufacture continuously the platinum oxide colloidal solution.

A platinum oxide colloidal solution manufacturing apparatus 60 for manufacturing the platinum oxide colloidal solution is provided with a vessel 61 for storing the aqueous solution of the alkali hexahydroxo platinate, a hydrogen form cation exchange resin tower (cation exchange resin tower) 63 filled with the hydrogen form cation exchange resin, a reaction vessel 64, a vessel 66 for storing the platinum oxide colloidal solution, and a gamma rays generation apparatus 67. The vessel 61 and the reaction vessel 64 are connected with a pipe 68, and the hydrogen form cation exchange resin tower 63 is installed on the pipe 68. A pump 62 is installed on the pipe 68 between the vessel 61 and the hydrogen form cation exchange resin tower 63. The pump 62 pressurizes the aqueous solution of the alkali hexahydroxo platinate which is a raw material. Further, the reaction vessel 64 and the vessel 66 are connected with a pipe 65. The gamma rays generation apparatus 67 faces to the reaction vessel 64. Gamma rays 33 from the gamma rays generation apparatus 67 are irradiated to a liquid passing through the reaction vessel 64 from the gamma rays generation apparatus 67.

In the platinum oxide colloidal solution manufacturing apparatus 60, the aqueous solution of the alkali hexahydroxo platinate adjusted to a predetermined concentration is stored in the vessel 61 and the aqueous solution is supplied to the hydrogen form cation exchange resin tower 63 by the pump 62. When the aqueous solution of the alkali hexahydroxo platinate passes through the hydrogen form cation exchange resin tower 63, hydrogen ions are substituted for the metallic ions included in the aqueous solution of the alkali hexahydroxo platinate and a suspension of hexahydroxo platinic is generated. The suspension is introduced into the reaction vessel 64 through the pipe 68 and the gamma rays 33 are irradiated to the suspension in the reaction vessel 64.

Irradiation of the gamma rays 33 of 7 kGy is necessary to change the suspension of hexahydroxo platinic in the whole quantity to a platinum oxide colloidal solution. For example, when the dose rate is 2 kGy/h, so that the suspension of hexahydroxo platinic stays in the reaction vessel 64 for more than 3.5 hours, the flow rate of the suspension of hexahydroxo platinic discharged from the pump 62 is adjusted. The platinum oxide colloidal solution generated in the reaction vessel 64 is introduced to the vessel 66 through the pipe 65 and is stored in the vessel 66.

The platinum oxide colloidal solution manufactured by the manufacturing method of the platinum oxide colloidal solution of the present embodiment has the aforementioned characteristics possessed by the platinum oxide colloidal solution manufactured by the manufacturing method of the platinum oxide colloidal solution of embodiment 1.

The present embodiment can obtain each effect produced in embodiment 1.

Embodiment 3

The inventors examined noble metal adsorption phenomenon to suppress the adsorption of the noble metal on the inner surface of the injection pipe. As a result, the following is found. An inner surface of an injection pipe of a noble metal injection apparatus connected to a pipe (for example, a water feed pipe, and a reactor purification system pipe, etc.) connected to a reactor pressure vessel is covered with an iron oxide while solution including noble metal is injected into the pipe connected to the reactor pressure vessel through the injection pipe. As a result, the inner surface of the injection pipe is charged negatively when it makes contact with neutral pure water (pH 7). When a neutral aqueous solution with a noble metal dissolved flows through the injection pipe, cations (for example, $Pt^{4+}$) of the noble metal in the aqueous solution are electrostatically adsorbed to the negatively charged inner surface of the injection pipe.

Material is charged positively when it is acid than the point of zero charge and is charged negatively when it is alkaline. The pH of water flowing through the pipe connected to the reactor pressure vessel is within a range from 5.6 to 8.6, so that it is considered that the inner surface of the pipe connected to the reactor pressure vessel is charged negatively. Therefore, the inventors reached the conclusion that if a material including a noble metal a surface of which is charged negatively when pH is 5.6 or higher, is used in order to prevent the noble metal from depositing to the respective negatively charged inner surfaces of the pipe connected to the reactor pressure vessel and the injection pipe connected to the aforementioned pipe, the adsorption of the material including the noble metal on each inner surface of the pipe connected to the reactor pressure vessel and the injection pipe can be suppressed due to the electrostatic force of repulsion and the material including the noble metal can be injected effectively into the reactor water in the reactor pressure vessel.

On the basis of this conclusion, the inventors examined the manufacture of material including a noble metal with the surface charged negatively. As a result, colloidal particles (platinum oxide colloidal particles) the surface of which are charged negatively, which include platinum oxide and platinum hydroxide, and has platinum oxide as a main component, can be manufactured.

The platinum oxide colloidal solution including the platinum oxide colloidal particles can be manufactured by the manufacturing method of the platinum oxide colloidal solution of embodiment 2 using the platinum oxide colloidal solution manufacturing apparatus 60. Further, the platinum oxide colloidal solution including the platinum oxide colloidal particles can be manufactured even by the manufacturing method of the platinum oxide colloidal solution of embodiment 1.

When manufacturing the platinum oxide colloidal solution including the platinum oxide colloidal particles using the platinum oxide colloidal solution manufacturing apparatus 60, firstly, the aqueous solution of alkali hexahydroxo platinate to be filled in the vessel 61 is produced as mentioned above (step S101). The aqueous solution of alkali hexahydroxo platinate to be produced is a solution of sodium hexahydroxoplatinate ($Na_2Pt(OH)_6$) or a solution of potassium hexahydroxoplatinate ($K_2Pt(OH)_6$). The aqueous solution of alkali hexahydroxo platinate in the vessel 61 passes through a hydrogen form cation exchange resin layer in the hydrogen form cation exchange resin tower (the cation exchange resin tower) 63 (step S102). The aqueous solution of alkali hexahydroxo platinate makes contact with the hydrogen form cation exchange resin in the hydrogen form cation exchange resin layer, thus, a suspension of hexahydroxo platinic is generated in the hydrogen form cation exchange resin tower 63. The gamma rays 33 are irradiated to the suspension of hexahydroxo platinic in the reaction vessel 64 (step S103). If the gamma rays 33 are irradiated to the suspension of hexahydroxo platinic at an absorption dose of 7 kGy or higher, a platinum oxide colloidal solution, in which there exist colloidal particles (platinum oxide colloidal particles) including platinum dioxide ($PtO_2$), platinum monoxide (PtO), and platinum hydroxide ($Pt(OH)_2$) can be produced. As a result of an analysis of the platinum oxide colloidal particles by the X-ray photoelectron spectroscopy (XPS), the platinum oxide colloidal particles include $PtO_2$ of 91 atomic %, PtO of 6 atomic %, and $Pt(OH)_2$ of 3 atomic % (refer to Table 1). As mentioned above, the platinum oxide colloidal particles are mostly platinum oxide. The platinum dioxide ($PtO_2$) and platinum monoxide (PtO) are a platinum oxide and the platinum hydroxide ($Pt(OH)_2$) is a platinum hydroxide. The platinum oxide colloidal solution is a noble metal compound colloidal solution including colloidal particles including a platinum oxide and a platinum hydroxide.

Figure 9:
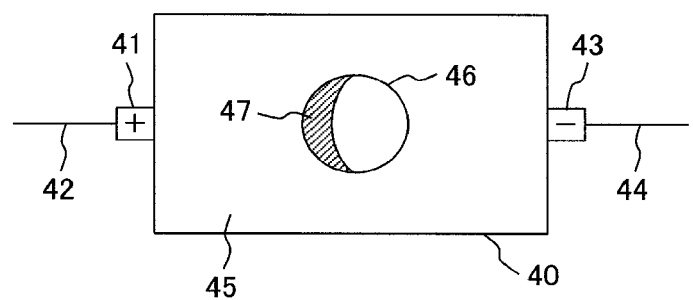
FIG. 9 is an explanatory drawing showing electrophoresis of platinum oxide colloidal particles.

The inventors made an experiment for investigation of the electrophoresis of the platinum oxide colloidal solution generated. As shown in FIG. 9, a petri dish 40 is filled with agar 45 with potassium chloride added and a positive electrode 41 connected to a conductive line 42 and a negative electrode 43 connected to a conductive line 44 are installed separately on both opposite side walls of the petri dish 40. The positive electrode 41 and the negative electrode 43 are in contact with the agar 45 in the petri dish 40. A brown and transparent platinum oxide colloidal solution 46 is dripped on the agar 45 in the petri dish 40. In this status, a voltage is applied between the positive electrode 41 and the negative electrode 43 and the platinum oxide colloidal solution 46 is subjected to the electrophoresis. As a result, as shown in FIG. 9, it is found that colloidal particles 47 including brown and transparent platinum oxide and platinum hydroxide existing in the platinum oxide colloidal solution 46 gather on the side of the positive electrode 41 and the colloidal particles 47 are charged negatively.

Figure 10:
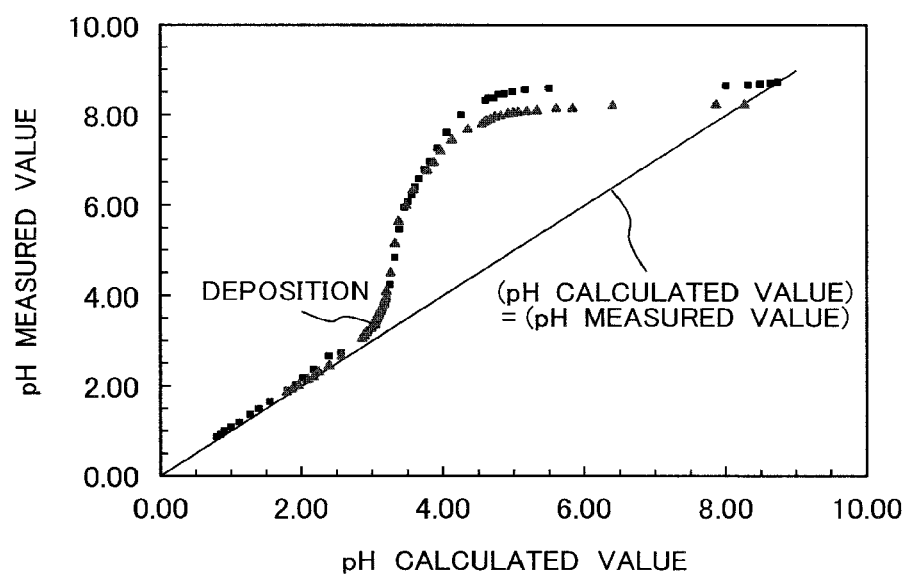
FIG. 10 is a characteristic diagram showing hydrochloric acid titration measurement results of platinum oxide colloids.

Furthermore, the inventors titrated hydrochloric acid in the platinum oxide colloidal solution 46, changed the pH of the platinum oxide colloidal solution 46, measured the pH of the platinum oxide colloidal solution 46, and observed precipitation of the platinum oxide colloidal particles 47. The pH measured values of the platinum oxide colloidal solution 46 are shown in FIG. 10 together with the pH calculated values of the platinum oxide colloidal solution 46. FIG. 10 shows that the pH calculated values calculated from the injection of the hydrochloric acid and the pH measured values coincide with each other in the vicinity of pH 3.0 and the surface potential of the platinum oxide colloidal particles becomes 0. At the time of titration of the hydrochloric acid, when the pH of the platinum oxide colloidal solution 46 is in the vicinity of 3.5, platinum oxide colloidal particles are precipitated. Therefore, it is found that the generated platinum oxide colloidal solution is charged negatively at pH of 5.6 or higher.

Figure 11:
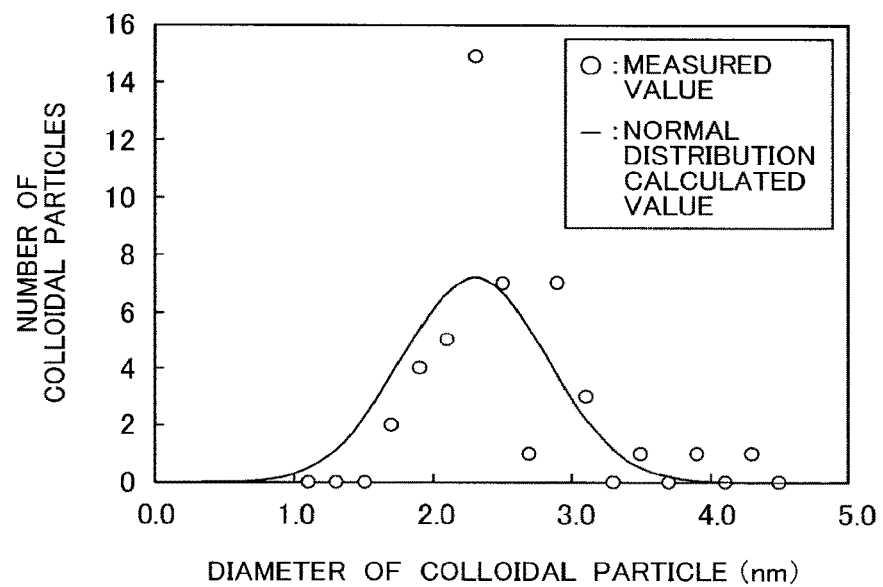
FIG. 11 is an explanatory drawing showing a particle diameter distribution of platinum oxide colloidal particles included in platinum oxide colloidal solution.

A transmission electron microscopic photograph of the generated platinum oxide colloidal particles is shown in FIG. 6. Further, the particle diameter distribution of the platinum oxide colloidal particles 71 (refer to FIG. 6) observed by the transmission electron microscope is shown in FIG. 11. As a result of observation by the transmission electron microscope, it is found that the particle diameter of the platinum oxide colloidal particles is within a range from 1.0 nm to 4.5 nm and the platinum oxide colloidal particles are nano particles. The platinum oxide colloidal solution manufactured by the aforementioned method is kept in a stably dispersed state for more than 6 months in the room temperature rest state.

A method of injecting a noble metal of the nuclear power plant according to embodiment 3 which is other preferable embodiment of the present invention to which the aforementioned investigation results of the inventors are reflected will be explained by referring to FIGS. 12 and 13.

Firstly, a structure of a boiling water nuclear power plant 25 to which the method of injecting a noble metal of the nuclear power plant of the present embodiment is applied will be explained by referring to FIG. 12. The boiling water nuclear power plant 25 is provided with a reactor pressure vessel 1, a turbine 4, a condenser 5, a reactor purification system, and a water feed system and the like. In the reactor pressure vessel 1, a core 2 loading a plurality of fuel assemblies is disposed internally. Each fuel assembly includes a plurality of fuel rods filled with a plurality of fuel pellets manufactured by a nuclear fuel material. A plurality of internal pumps (not drawn) are installed at the bottom of the reactor pressure vessel 1. A main steam pipe 3 connected to the reactor pressure vessel 1 is connected to the turbine 4.

The water feed system is structured so as to install a condensate filter demineralizer 7, a water feed pump 8, and a feed water heater 9 on a water feed pipe 6 which is connected the condenser 5 and the reactor pressure vessel 1, from the condenser 5 toward the reactor pressure vessel 1 in this order. The turbine 4 is installed on the condenser 5 and the condenser 5 is communicated with the turbine 4. A bypass pipe 10 connected to the main steam pipe 3 is connected to the condenser 5 through the feed water heater 9.

The reactor purification system has a structure in which a purification system pump 12, a regeneration heat exchanger 13, a non-regeneration heat exchanger (not drawn), and a reactor water purification apparatus 14 are installed on a purification system pipe 11 for connecting the reactor pressure vessel 1 and the water feed pipe 10 in this order. The purification system pipe 11 is connected to the water feed pipe 6 on the downstream side of the feed water heater 9. The reactor pressure vessel 1 is installed in the reactor primary containment vessel disposed in the reactor building (not drawn).

Cooling water in the reactor pressure vessel 1 (hereinafter, referred to as reactor water) is pressurized by the internal pump and is supplied to the core 2. The reactor water supplied to the core 2 is heated by heat generated by nuclear fission of the nuclear fuel material in each fuel rod and a part of the heated reactor water is vaporized. The steam is removed moisture by the steam separator (not drawn) and steam drier (not drawn) installed in the reactor pressure vessel 1, then is introduced from the reactor pressure vessel 1 to the turbine 4 through the main steam pipe 3, and rotates the turbine 4. The generator (not drawn) connected to the turbine 4 rotates and power is generated.

The steam discharged from the turbine 4 is condensed to water by the condenser 5. The water, as feed water, is supplied into the reactor pressure vessel 1 through the water feed pipe 6. The feed water flowing through the water feed pipe 6 is removed impurities by the condensate filter demineralizer 7 and is pressurized by the water feed pump 8. The feed water is heated in the feed water heater 9 by extraction steam extracted from the main steam pipe 3 by the bypass pipe 10 and is introduced into the reactor pressure vessel 1 through the water feed pipe 6.

A part of the reactor water in the reactor pressure vessel 1 flows into the purification system pipe 11 of the reactor purification system by driving of the purification system pump 12, is cooled by the regeneration heat exchanger 13 and the non-regeneration heat exchanger, and then is purified by the reactor water purification apparatus 14. The purified reactor water is heated by the regeneration heat exchanger 13 and is returned into the reactor pressure vessel 1 through the purification system pipe 11 and the water feed pipe 6.

A hydrogen injection apparatus 15 and a platinum oxide colloid injection apparatus 16 are connected to the water feed pipe 6 on the downstream side of the condensate filter demineralizer 7. The platinum oxide colloidal injection apparatus 16 includes a colloidal solution tank 17, an injection pipe 18, and an injection pump 19 as shown in FIG. 13. The injection pipe 18 connected to the colloidal solution tank 17 is connected to the water feed pipe 6. An open/close valve 20, a flow rate meter 26, the injection pump 19, and an open/close valve 24 are installed on the injection pipe 18 from the colloidal solution tank 17 toward the water feed pipe 6 in this order. Using the platinum oxide colloidal solution manufacturing apparatus 60 shown in FIG. 8, the platinum oxide colloidal solution produced by the method of manufacturing platinum oxide colloidal solution shown in FIG. 1, that is, the platinum oxide colloidal solution having the pH of 7 to 8.5 and including the platinum oxide colloidal particles each surface of which is charged negatively is filled in the colloidal solution tank 17. The platinum oxide colloidal solution includes platinum oxide colloidal particles with a diameter within a range from 1.0 nm to 4.5 nm and including platinum dioxide ($PtO_2$), platinum monoxide (PtO), and platinum hydroxide ($Pt(OH)_2$), that is, platinum oxide colloidal particles including platinum oxide and platinum hydroxide. The platinum oxide colloidal particles are charged negatively at the pH of 5.6 or higher.

When the boiling water nuclear power plant 25 is in operation, hydrogen is injected from the hydrogen injection apparatus 15 into the water feed pipe 6 and the platinum oxide colloidal solution is injected from the platinum oxide colloidal injection apparatus 16 into the water feed pipe 6. The hydrogen and the platinum oxide colloidal solution injected into the feed water flowing through the water feed pipe 6 are injected into the reactor water in the reactor pressure vessel 1 through the water feed pipe 6.

The injection of the platinum oxide colloidal solution will be explained concretely. If the open/close valves 20 and 24 are opened and the pump 19 is driven, the platinum oxide colloidal solution including the platinum oxide colloidal particles in the colloidal solution tank 17 is injected into the feed water flowing through the water feed pipe 6 and the injection pipe 18. The platinum oxide colloidal solution in the colloidal solution tank 17, the feed water flowing through the water feed pipe 6, and the reactor water in the reactor pressure vessel have the pH of 5.6. The platinum oxide colloidal solution having the pH of 7 to 8.5 and including the platinum oxide colloidal particles charged negatively flows through the injection pipe 18 with the inner surface charged negatively, so that the platinum oxide colloidal particles charged negatively and the inner surface of the injection pipe 18 repel each other, thus the platinum oxide colloidal particles included in the platinum oxide colloidal solution are not adsorbed to the inner surface of the injection pipe 18 and the platinum oxide colloidal solution is injected into the water feed pipe 6. In correspondence to the platinum oxide colloidal particles not adsorbed to the inner surface of the injection pipe 18, the platinum oxide colloidal particles injected into the water feed pipe 6 are increased in quantity and the quantity of platinum oxide injected into the water feed pipe 6 is increased.

The inner surface of the water feed pipe 6 is also charged negatively, so that the platinum oxide colloidal particles charged negatively which are injected into the feed water with the pH of 5.6 are not adsorbed even to the inner surface of the water feed pipe 6 and the platinum oxide colloidal particles injected into the reactor water in the reactor pressure vessel 1 are increased. In the reactor pressure vessel 1, gamma rays generated due to the nuclear fission of the nuclear fuel material included in the fuel rods of each fuel assembly loaded in the core 2 are irradiated to the reactor water, so that hydrogen ions ($H^+$) are generated due to radiolysis of the reactor water and radiolysis of hydrogen peroxide included in the reactor water. The hydrogen ions combine with the oxygen of the platinum oxide included in the platinum oxide colloidal particles injected into the reactor water or OH of the platinum hydroxide to generate water, so that the platinum of the platinum oxide and platinum hydroxide becomes platinum ions ($Pt^{4+}$). The platinum ions are adsorbed to the surface (the surface in contact with the reactor water) of the reactor internal in the reactor pressure vessel 1 and the inner surface of the pipe connected to the reactor pressure vessel 1 through which the reactor water flows.

As mentioned above, hydrogen is injected into the reactor water, so that the reaction of the dissolved oxygen and hydrogen peroxide included in the reactor water with hydrogen is promoted by the action of the platinum adsorbed to the surface of the reactor internal and the inner surface of the pipe. Therefore, the oxygen concentration and hydrogen peroxide concentration in the reactor water are reduced and the stress corrosion cracking of the reactor internal and pipe in contact with the reactor water is suppressed.

Figure 14:
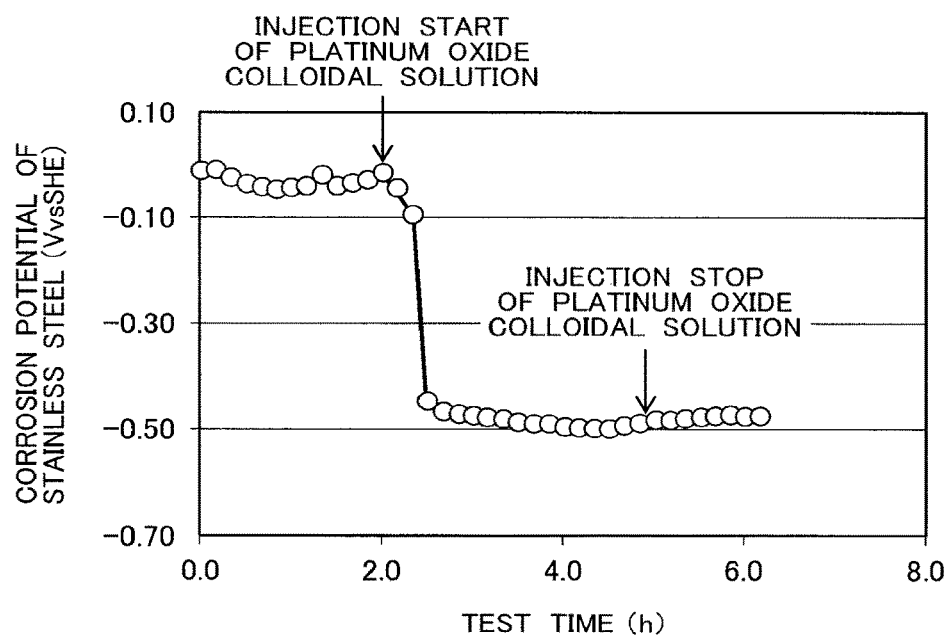
FIG. 14 is an explanatory drawing showing a change of stainless steel corrosion potential due to injection of platinum oxide colloidal solution into high-temperature water at 280° C.

The platinum oxide colloidal solution produced by the manufacturing processes shown in FIG. 1 in which the platinum oxide colloidal particles including platinum dioxide ($PtO_2$), platinum monoxide (PtO), and platinum hydroxide ($Pt(OH)_2$) exist, is injected into a stainless steel pipe through which high-temperature water at 280° C. following the reactor water flows, and the response of the inner surface of the stainless steel pipe is investigated, and the results are shown in FIG. 14. The high-temperature water at 280° C. including hydrogen peroxide of 400 ppb and hydrogen of 130 ppb flows through the stainless steel pipe and the platinum oxide colloidal solution in which the aforementioned platinum oxide colloidal particles exist is injected from the upstream side. As a result, if the platinum oxide colloidal solution is injected, immediately, the corrosion potential of the stainless steel pipe is reduced from 0.0 VvsSHE to −0.5 VvsSHE. Even if the injection of the platinum oxide colloidal solution is stopped, the corrosion potential of the stainless steel pipe is maintained just at −0.5 VvsSHE.

Figure 15:
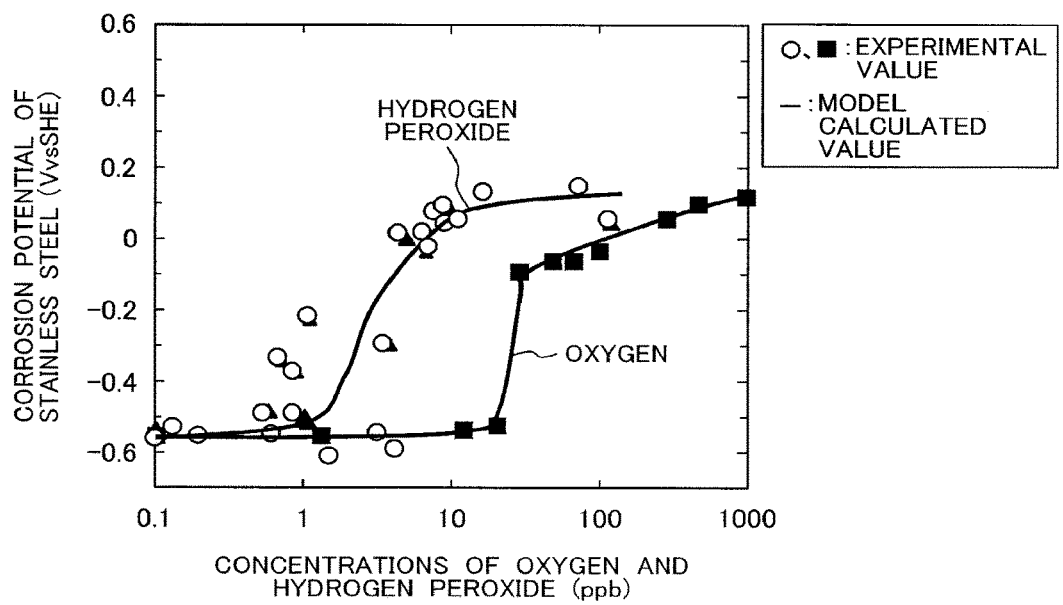
FIG. 15 is a characteristic diagram showing the influence of oxygen and hydrogen peroxide concentrations on stainless steel corrosion potential in high-temperature water at 280° C.

The relation between the oxygen concentration and hydrogen peroxide concentration in the high-temperature water and the corrosion potential of the stainless steel pipe is shown in FIG. 15. If the oxygen concentration in the high-temperature water becomes 10 ppb or lower or the hydrogen peroxide concentration in the high-temperature water becomes 1 ppb or lower, the corrosion potential of the stainless steel pipe is reduced to −0.5 VvsSHE. Namely, by this experiment, it is confirmed that the platinum oxide colloidal particles are deposited on the inner surface of the stainless steel pipe and the oxygen on the inner surface of the stainless steel pipe is reduced to 10 ppb and the hydrogen peroxide concentration is reduced to 1 ppb or lower.

According to the present embodiment, the platinum oxide colloidal solution including the platinum oxide colloidal particles including platinum oxide and platinum hydroxide, the platinum oxide colloidal particles being charged negatively within the range of pH of 5.6 or higher, is injected into the water feed pipe 6 through the injection pipe 18 and furthermore is injected into the reactor water in the reactor pressure vessel 1, so that the platinum oxide colloidal particles are not adsorbed to the inner surface of the injection pipe 18 and the quantity of the platinum oxide colloidal particles injected into the reactor water in the reactor pressure vessel 1 is increased. Therefore, as usual, in consideration of deposition of platinum on the respective inner surfaces of the injection pipe 18 and the water feed pipe 6, excessive injection of platinum can be avoided. In the present embodiment, when the quantity of platinum injected into the reactor water exceeds a necessary predetermined quantity due to an increase in the injection quantity of the platinum oxide colloidal particles into the reactor water, the platinum oxide colloidal solution injected from the colloidal solution tank 17 into the water feed pipe 6 can be reduced.

The platinum oxide colloidal particles injected into the reactor water are nano particles having a particle diameter within a range from 1.0 nm to 4.5 nm, so that even if a dispersant such as alcohol is not used, the particles are dispersed stably in the reactor water. Therefore, platinum can be deposited effectively on the surface of the reactor internal in the reactor pressure vessel 1 and the inner surface of the pipe connected to the reactor pressure vessel 1 through which the reactor water flows.

In the present embodiment, the platinum oxide colloidal solution including the platinum oxide colloidal particles and injected into the reactor water is generated in the processes shown in FIG. 1 by generating the suspension of hexahydroxo platinic by substituting hydrogen ions for the cations included in the hexahydroxo platinate solution, and irradiating gamma rays to the suspension of hexahydroxo platinic, so that the content of impurities is little and the platinum oxide colloidal particles become nano particles. Therefore, due to injection of the platinum oxide colloidal solution into the reactor water, the impurities injected in the reactor water become very little. The platinum oxide colloidal particles are nano particles with the particle diameter aforementioned, so that as mentioned above, the dispersibility to the reactor water is improved.

The injection pipe 18 of the platinum oxide colloid injection apparatus 16 may be connected to another pipe connected to the reactor pressure vessel 1, for example, the purification system pipe 11 or the pipe of the residual heat removal system instead of the water feed pipe 6. When connecting the injection pipe 18 to the purification system pipe 11, the injection pipe 18 may be connected to the purification system pipe 11 on the downstream side of the reactor water purification apparatus 14.

Embodiment 4

A method of injecting a noble metal of the nuclear power plant according to embodiment 4 which is other preferable embodiment of the present invention will be explained by referring to FIG. 16.

Figure 16:
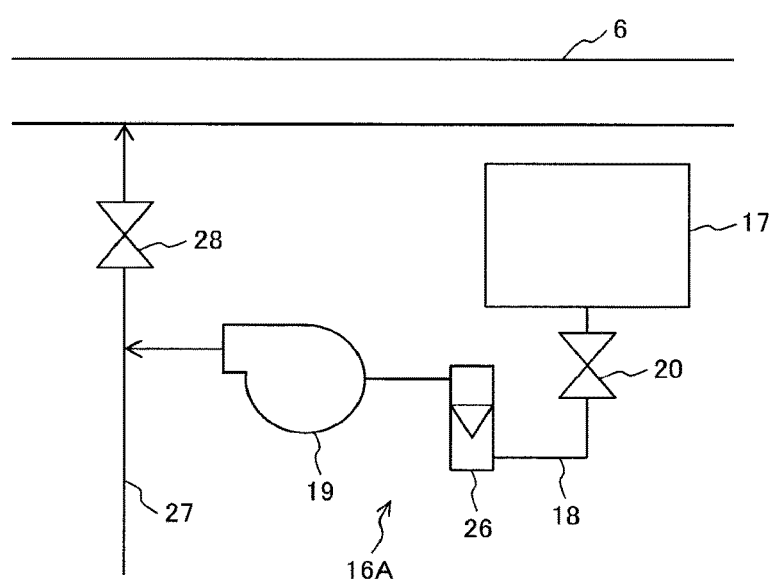
FIG. 16 is a structural diagram showing a noble metal compound injecting apparatus applied to a method of injecting noble metal of a nuclear power plant according to embodiment 4 which is another preferable embodiment of the present invention.

A platinum oxide colloid injection apparatus 16A used for the method of injecting a noble metal of the present embodiment, similarly to the platinum oxide colloid injection apparatus 16, includes the colloidal solution tank 17, the injection pipe 18, and the injection pump 19 as shown in FIG. 16. The open/close valve 20, the flow rate meter 26, and the injection pump 19 are installed on the injection pipe 18 connected to the colloidal solution tank 17 in this order from the colloidal solution tank 17 toward the downstream side. The injection pipe 18 is connected to an injection pipe 27 of a zinc injection apparatus (not drawn) connected to the water feed pipe 6. An open/close valve 28 is installed on the injection pipe 27 and a connection point of the injection pipe 18 to the injection pipe 27 is positioned on the upstream side of the open/close valve 28. The colloidal solution tank 17 is filled with the platinum oxide colloidal solution including the platinum oxide colloidal particles which has the pH of 7 to 8.5 and is charged negatively.

Figure 12:
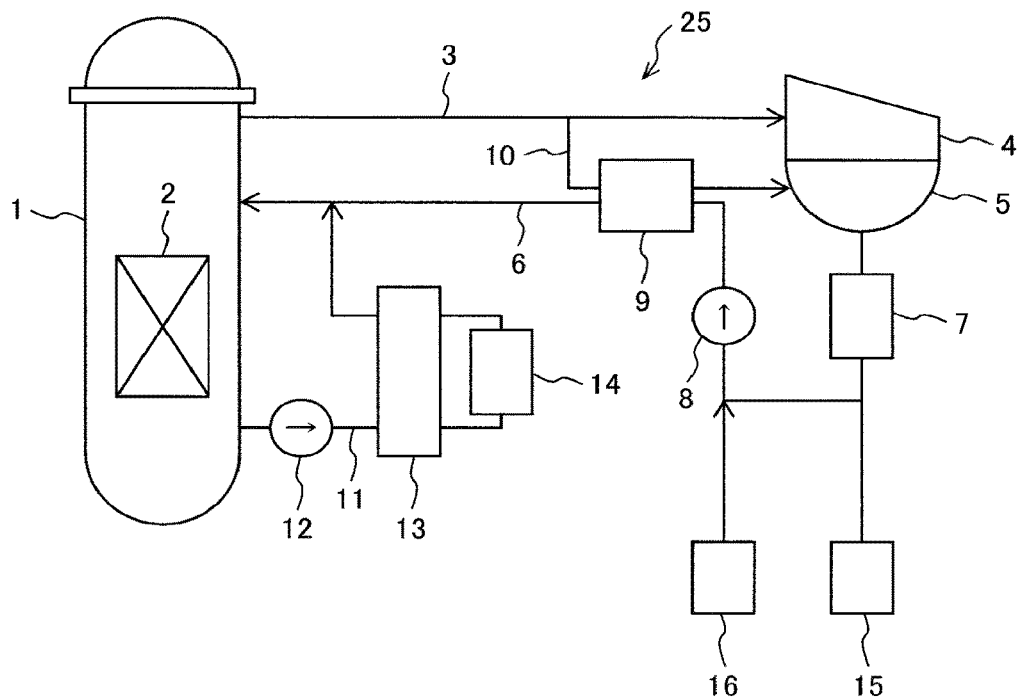
FIG. 12 is a structural diagram showing a boiling water nuclear power plant to which a method of injecting noble metal of a nuclear power plant according to embodiment 3 which is another preferable embodiment of the present invention is applied.
Figure 13:
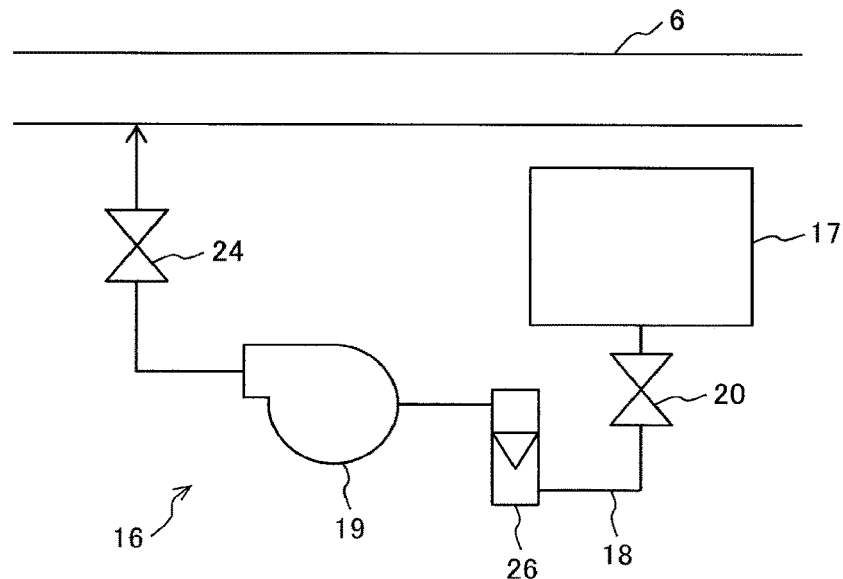
FIG. 13 is a detailed structural diagram showing a noble metal compound injecting apparatus shown in FIG. 12.

The nuclear power plant to which the method of injecting a noble metal of the present embodiment is applied has a structure that the platinum oxide colloid injection apparatus 16 is replaced with the platinum oxide colloid injection apparatus 16A in the boiling water nuclear power plant 25 shown in FIG. 12. The injection pipe 27 is connected to the water feed pipe 6. Similarly to embodiment 3, the injection pipe 27 may be connected to the purification system pipe 11 on the downstream side of the reactor water purifier 14.

When the boiling water nuclear power plant is in operation, the open/close valves 20 and 28 are opened and the injection pump 19 is driven, thus the platinum oxide colloidal solution having the pH of 7 to 8.5 and including the platinum oxide colloidal particles which is charged negatively is injected into the feed water in the water feed pipe 6 from the colloidal solution tank 17 through the injection pipes 18 and 27. The feed water of pH 6 including the platinum oxide colloidal particles is injected into the reactor water of pH 5.6 in the reactor pressure vessel 1 through the water feed pipe 6. The platinum included in the platinum oxide colloidal particles in the reactor water, similarly to embodiment 1, is adsorbed to the surface of the reactor internal in contact with the reactor water and the inner surface of the pipe connected to the reactor pressure vessel 1. The dissolved oxygen concentration and the hydrogen peroxide concentration in the reactor water are reduced by the action of the platinum and the generation of stress corrosion cracking in the reactor internal and pipe is suppressed.

A solution including zinc is injected into the water feed pipe 6 from the injection pipe 27 of the zinc injection apparatus. As a result, the solution including zinc and the platinum oxide colloidal solution are mixed in the injection pipe 27 and the mixed solution is supplied to the water feed pipe 6. The pH of the solution including zinc is 4 to 6, so that the platinum colloidal particles charged negatively which are included in the platinum oxide colloidal solution are not adsorbed to the respective inner surfaces of the injection pipes 18 and 23.

The present embodiment can obtain each effect generated in embodiment 3. Further, the present embodiment shares a part of the injection pipe 27 for injecting the solution including zinc as a pipe for injecting the platinum oxide colloidal solution, so that the platinum oxide colloid injection apparatus 16A can be made compacter than the platinum oxide colloid injector 16.

REFERENCE SIGNS LIST

1: Reactor pressure vessel, 2: Core, 4: Turbine, 5: Condenser, 6: Water feed pipe, 8: Water feed pump, 11: Purification system pipe, 14: Reactor water purification apparatus, 15: Hydrogen injection apparatus, 16, 16A: Platinum oxide colloid injection apparatus, 17: Colloidal solution tank, 18, 27: Injection pipe, 21, 23, 35, 61, 66: Vessel, 22, 63: Hydrogen form cation exchange resin tower, 31: Gamma rays generation source, 32: Suspension of hexahydroxo platinic, 33: Gamma rays, 60: Platinum oxide colloidal solution manufacturing apparatus, 62: Pump, 64: Reaction vessel, 65, 68: Pipe, 67: Gamma rays generation apparatus, 71: Colloidal particles

What is claimed is:

1. A method of manufacturing a platinum oxide colloid comprising:
    (1) an ion exchange process of substituting hydrogen ions for cations included in an aqueous solution of hexahydroxoplatinate salt to generate a suspension; and
    (2) irradiating gamma rays to said suspension to generate the platinum oxide colloid.

2. The method of manufacturing a platinum oxide colloid according to claim 1, wherein said aqueous solution of hexahydroxoplatinate salt comes into contact with a hydrogen form cation exchange resin in said ion exchange process.

3. The method of manufacturing a platinum oxide colloid according to claim 1, wherein said hexahydroxoplatinate salt is sodium hexahydroxoplatinate or potassium hexahydroxoplatinate.

4. The method of manufacturing a platinum oxide colloid according to claim 1, wherein said aqueous solution of hexahydroxoplatinate salt includes alcohol.

5. The method of manufacturing a platinum oxide colloid according to claim 4, wherein when the number of carbons configuring a molecule of said alcohol is n, a concentration of said alcohol in the aqueous solution of hexahydroxoplatinate salt is lower than 0.17/n (mM).

6. The method of manufacturing a platinum oxide colloid according to claim 4, wherein when the number of carbons configuring a molecule of said alcohol is n, a concentration of said alcohol in the aqueous solution of hexahydroxoplatinate salt is 0.03/n (mM) or lower.

7. The method of manufacturing a platinum oxide colloid according to claim 1, wherein an irradiation quantity of said gamma rays is 7 kGy or larger.

8. The method of manufacturing a platinum oxide colloid according to claim 1, wherein said colloid comprises platinum oxide and platinum hydroxide.

9. The method of manufacturing a platinum oxide colloid according to claim 1, wherein said irradiating gamma rays to said suspension is executed before said colloid is injected into a coolant of a water-cooled nuclear reactor.

10. The method of manufacturing a platinum oxide colloid according to claim 1, wherein each surface of particles of said colloid is negatively charged at pH 5.6 or higher.

11. The method of manufacturing a platinum oxide colloid according to claim 1, wherein particles of said colloid have a diameter in a range from 1.0 nm to 4.5 nm.

* * * * *